United States Patent [19]

Biardeau et al.

[11] Patent Number: 4,810,479

[45] Date of Patent: Mar. 7, 1989

[54] PREPARATION OF CUBIC BORON NITRIDE USING AS A FLUX A FLUORONITRIDE

[75] Inventors: Gilles Biardeau, Talence; Gérard Demazeau, Gradignan; Michel Pouchard, Le Pian Medoc, all of France

[73] Assignee: Centre National de la Recherche Scientifique (CNRS), Paris, France

[21] Appl. No.: 38,565

[22] Filed: Apr. 15, 1987

[30] Foreign Application Priority Data

Apr. 15, 1986 [FR] France ................ 86 05353

[51] Int. Cl.$^4$ ........................... C01B 21/064
[52] U.S. Cl. .................... 423/290; 423/276; 423/351; 423/406; 501/96
[58] Field of Search ............... 423/278, 279, 287, 290, 423/409, 351, 276; 501/96

[56] References Cited

U.S. PATENT DOCUMENTS

| | | | |
|---|---|---|---|
| 3,959,443 | 5/1976 | Kabayama | 423/290 |
| 4,287,164 | 9/1981 | Endo et al. | 423/290 |
| 4,389,223 | 6/1983 | Corrigan | 423/290 |
| 4,409,193 | 10/1983 | Sato et al. | 423/279 |
| 4,443,420 | 4/1984 | Sato et al. | 423/290 |
| 4,469,802 | 9/1983 | Endo et al. | 423/290 |
| 4,551,195 | 11/1985 | Iizuka et al. | 423/290 |
| 4,551,316 | 11/1985 | Iizuka | 423/276 |
| 4,562,050 | 12/1985 | Koeda et al. | 423/290 |
| 4,590,034 | 5/1986 | Hirano et al. | 501/96 |
| 4,699,687 | 10/1987 | Yazu et al. | 423/210 |

FOREIGN PATENT DOCUMENTS 0860499  2/1961  United Kingdom ............... 423/290

OTHER PUBLICATIONS

The Journal of Chemical Physics, vol. 34, No. 3, Mar. 1961, pp. 809–812, Wentorf, Jr.

Materials Research Bulletin, vol. 14, No. 12, Dec. 1979, pp. 1541–1551, Kobayashi.

Primary Examiner—Anthony McFarlane
Attorney, Agent, or Firm—Cushman, Darby & Cushman

[57] ABSTRACT

A process for producing cubic boron nitride comprises heating at an elevated temperature and under high pressure a source of boron and a source of nitrogen in the presence of a fluoronitride or a source of fluoronitride.

14 Claims, No Drawings

PREPARATION OF CUBIC BORON NITRIDE USING AS A FLUX A FLUORONITRIDE

The present invention relates to the use of, a fluoronitride, in the preparation of cubic boron nitride, and to a process for preparing cubic boron nitride using said flux.

It is known that boron nitride can be obtained under various crystalline forms, or under graphite type hexagonal form, or under wurtzite hexagonal form, or under blend type cubic form, when the product is submitted to sufficient pressure and temperature.

It is also known that cubic boron nitride is, after diamond, the hardest material actually known. Its mechanical properties permit its use principally in the production of cutting and crushing equipment, or even in the production of materials employed as abrasives or polishing agents.

Further, it is known that it is possible to convert graphite type hexagonal boron nitride into cubic boron nitride, but this conversion requires high pressures and temperatures: $P=10$ GPa; and $T=2000°$ C.; see for example F. B. Bundy et al, J. Chem. Phys., 38, 1144, 1963.

It is also known that it is possible to lower the temperature required for certain reactions between solids by using flux type additives which act principally as "melting" agents so as to obtain a liquid phase at a temperature lower than the melting temperature of the reactants. Such fluxes are generally products capable of forming a eutectic with the reactants which permits operation at temperatures less high than would be the case in the absence of the flux.

The use of various fluxes (again called "solvents" or "catalysts") has been proposed for the preparation of cubic boron nitride starting from graphite type hexagonal boron nitride. It is known that the presence of oxygen is not favorable because it inhibits the action of certain catalysts. Fluorides also cause a shift of the synthesis field of cubic boron nitride toward high pressures; see for example T. Kobayashi, Mat. Res. Bull., Vol. 14, pp. 1541–1551, 1979.0

The nitride systems of calcium boron-nitride and magnesium boron-nitride have been studied. These systems permit the production of eutectics consisting of a mixture of boron nitride and calcium or magnesium boronitride. The use of such systems as a flux requires, however, operation at temperatures greater than 1400° C.; see in particular Tadashi Endo et al, Journal of Material Science, 14, 1676, 1680 (1979) and 16, 2227–2232 (1981).

It has now been discovered that fluoronitrides are useful as a flux in processes for producing cubic boron nitride, without encountering the disadvantages of nitrides and fluorides.

The present invention thus relates to the use of, as a flux, in a process to produce cubic boron nitride, a fluoronitride or a source of fluoronitride.

The fluoronitride is selected, in particular, from among metal fluoronitrides such as alkali or alkaline earth metal fluoronitrides or mixed fluoronitrides of these metals. The fluoronitrides can be mixed with fluorides, principally in the form of solid solutions. There are employed, mainly, the fluoronitrides of magnesium, calcium or barium, or the mixed fluoronitrides of these metals with an alkali metal or with other metals such as, for example, manganese or zirconium or even mixtures of these fluoronitrides and alkali fluorides, in particular solid solutions of a fluoronitride and an isostructural fluoride.

There can also be employed a source of fluoronitride comprising a nitride and a source of fluoride. The source of nitride is, for example, a nitride or boronitride, for example, $M_3N_2$ or $M_3B_2N_4$ (where M is magnesium, calcium or barium), which can be obtained in accordance with known methods. The source of fluoride is selected, for example, from among the fluorides or fluosilicates of ammonium, alkali metals or alkaline earth metals, manganese or zirconium and the fluoroborates of ammonium or alkali metals or any material capable of giving a fluoride on decomposition. The nitride is selected principally from alkaline earth metal nitrides and the alkali metal nitrides.

The fluoronitride can be prepared prior to the reaction to produce the cubic boron nitride; in certain instances, it can be formed in situ during the said reaction.

Generally, the fluoronitrides can be prepared in accordance with the methods mentioned, for example, in the publication of A. F. Wells, Structural Inorganic Chemistry, 5th Edition, Clarendon Press-Oxford, 1984, pp. 475–476.

As indicated above, the present invention extends to the use of, as a flux, in the preparation of cubic boron nitride, mixtures of nitrides (or boronitrides) and fluorides. Among the various fluxes studied, the system (M, M', N, F) where M is an alkaline earth metal and M' is an alkali metal is of great interest because it provides, under certain conditions, the production of crystals of cubic boron nitride having a large size.

The study of the ($Ca_3$, $N_2$, LiF) system in the conversion, under pressure, of hexagonal boron nitride into cubic boron nitride, revealed in the residual mixture a non-hygroscopic unknown phase which has been identified as mixed boronitride of calcium and lithium having the formula $Ca_{3-x}Li_xB_2N_{4-x/3}$. However, a catalytic effect is observed for this compound only in the presence of fluoride. It can thus be concluded that the dissolution of hexagonal boron nitride and the crystallization of cubic boron nitride is made in this case in a melted boronitridefluoride flux (eutectic) which is equivalent to a fluoronitride (more exactly a borofluoronitride in this precise case).

The present invention thus relates, in particular, to the use, as a flux, in the preparation of cubic boron nitride, of a mixed boronitride of formula I:

$$M_{3-x}M'_xB_2N_{4-x/3} \qquad \text{(I)}$$

wherein
M is an alkaline earth metal,
M' is an alkali metal, and
x is a number ranging from 0 to 1.

In the compounds of formula I, the value of x depends on the nature of the metals M and M'. For example, in the case where $M=Ca$ and $M'=Li$, the maximum value of x is equal to 0.3. For higher quantities of Li, there is more substitution of the calcium by the lithium.

The study by X-ray diffraction of the compounds of formula I shows that they crystallize in the cubic system. In the case where $M=Ca$ and $M'=Li$, the parameter of the opening decreases when x increases from 5.16 Angstroms for $x=0$ up to 5.03 Angstroms for $x=0.3$.

The boronitrides of formula I are used as a flux, in accordance with the present invention in admixture with at least one fluoride. The fluoride is, for example, an alkali fluoride or an alkaline earth fluoride, $MnF_2$, $ZrF_4$, etc.

The compounds of formula I can be prepared by the reaction of a boronitride $M_3B_2N_4$ (or one of its precursors $Ca_3N_2$+boronitride) with an alkali nitride at about 950° C., in accordance with the following reaction scheme:

$$Ca_3B_2N_4 + x/3 Li_3N \longrightarrow Ca_{3-x}Li_xB_2N_{4x/3} + \frac{x}{3} Ca_3N_2.$$

It is known that the boronitrides of the $Ca_3B_2N_4$ type can be prepared by the reaction of calcium with boron nitride in accordance with the following reaction scheme:

$$\frac{10}{3} Ca + 4BN \longrightarrow Ca_3B_2N_4 + \frac{1}{3} CaB_6$$

They can also be prepared more simply by the following reaction scheme:

$$Ca_3N_2 + 2BN \rightarrow Ca_3B_2N_4$$

Mixtures of the boronitride of formula I and the fluoride can be obtained directly by the reaction of a boronitride of the $Ca_3B_2N_4$ type (or a precursor thereof) with an alkali fluoride in accordance with the following reaction scheme:

$$Ca_3B_2N_4 + xLiF \longrightarrow$$

$$Ca_{3-x}Li_xB_2N_{4-x/3} + \frac{x}{6} Ca_3N_2 + \frac{x}{2} CaF_2.$$

However, there can in this case be employed an excess of lithium fluoride if it is desired to increase the proportion of fluorides in the catalyst system.

It is preferred, however, to prepare, previously, the boronitride of formula I, which is a non-hygroscopic compound and which can then be mixed at will with the selected proportions of the flruoride for use as a flux.

The compounds of formula I, for which x is other than zero, are new products.

The present invention also relates to a process for preparing cubic boronitride charcterized by the fact:

that the starting product includes a source of boron and a source of nitrogen, the said sources of boron and nitrogen being in condensed form (that is, in solid or liquid form) under standard conditions of temperature and pressure:

that the process is conducted in the presence of a fluoronitride or a source of fluoronitride;

that the process is carried out at a sufficient pressure corresponding to the domain of existence of the cubic boron nitride and that it is carried out at a temperature sufficient so that a liquid phase appears; and that after a sufficient reaction time, a quenching in temperature is performed; the reaction mixture is brought to atmospheric pressure; and if desired, the cubic boron nitride is separated by conventional methods.

The formation of cubic boron nitride is favored by high pressures and high temperatures. Variations of the temperature and/or pressure during the operation of the process can influence principally the size or surface state of the crystals of the resulting cubic boron nitride.

The process of the present invention is operated, preferably, at a pressure at least slightly higher than the minimum pressure at which the cubic boron nitride exists or forms in the system employed. This minimum pressure can be determined in each case by simple rouine experimentation. It is generally between 4 and 9 GPa.

The reaction temperature is generally equal to at least 1000° C.

In particular embodiments of the present invention, the process can again have the following characteristics, taken singly or in combination in accordance with the case:

the source of boron includes an ammonium or alkali metal fluoroborate or an alkaliborohydride;

the source of nitrogen is selected from the nitrides, boronitrides, amides and non-oxygenated ammonium salts such as the fluoroborates and fluorosilicates;

the source of boron and nitrogen can be constituted by graphite type hexagonal boron nitride;

the fluoronitride, or the source of fluoronitride is that defined above;

the fluoronitride, or source of fluoronitride, is present in amounts depending principally on the constitution of the reaction cell and the reactants employed; the amounts can range from 10 to 70%, and generally from 10 to 60% by weight relative to the total weight of the starting products.

The reactant or reactants and the flux (or its precursor) are employed in the form of powders, or in admixture, or in the form of alternate layers of reactant and flux.

This latter method of operation, in the form of alternate layers, favors the growth of the crystals at the expense of germination, and provides then crystals of larger size.

The optimum amount of catalyst (flux) can be determined in each case by simple routine experimentation, as a function principally of the size desired for the crystals of cubic boron nitride.

Generally, the reactant/flux mass ratio ranges from 0.25 to 4.

To separate the cubic boron nitride from the other compounds of the final product conventional procedures can be employed which are based principally on density differences, for example, entrainment by a fluid on inclined vibrating beds. The fluoronitrides can also be removed by chemical methods. For example, the fluoronitride $Mg_2NF$ or $Ca_2NF$ can be removed by an aqueous solution of hydrochloric or nitric acid. The fluoronitride $Mg_3NH_3$ is more difficult to remove. On heating at atmospheric pressure in air and at a temperature lower than the retransformation temperature of cubic boron nitride into graphite type hexagonal boron nitride for example, at about 700° C.-900° C., it reacts with graphite type hexagonal boron nitride remaining or added, if necessary, to form a magnesium fluoroborate $Mg_3F_3(BO_3)$.

The fluoroborate is the easily removed by treatment with a solution of hydrochloric acid. It can be seen then that in the case of using magnesium fluoronitride there is an interest to avoid all excess of magnesium fluoride (relative to the nitride) to favor the formation of $Mg_2NF$ rather than that of $Mg_3NF_3$.

The following non-limiting examples are given to illustrate the invention.

In these examples there is employed an apparatus generating high pressures in solid phase of the type having an annular chamber analogous to that which is described, for example, in French Pat. No. 1.457.690.

EXAMPLE 1

Conversion of hexagonal boron nitride into cubic boron nitride in the presence of magnesium fluoronitride Prior to the operation, there is reacted, in a sealed platinum tube at atmospheric pressure, a mixture of $MgF_2$ and $Mg_3N_2$ in the molar ratio of 1:1. After 20 hours at 1000° C. a mixture of fluoronitrides $Mg_2NF+Mg_3NF_3$ is obtained.

The resulting fluoronitrides are mixed with hexagonal boron nitride in a weight ratio of 1:1.

The pulverized mixture is introduced into a platinum capsule, precompacted and disposed in a pyrophyllite cell. The cell is then placed in the apparatus having an annular chamber for generating high pressure. The pressure is at first increased slowly, and the temperature is increased at constant pressure. In this example, a pressure of 70 kbar and a temperature of 1200° C. which is maintained for 10 minutes are employed. The temperature is then tempered and the pressure is slowly lowered to atmospheric pressure.

X-ray studies of the resulting mixture reveal that this mixture is constituted of cubic boron nitride, hexagonal boron nitride, the fluoronitrides $Mg_2NF$ ahd $Mg_3NF_3$ and another fluoronitride of unknown composition. The amount of conversion of the hexagonal boron nitride into cubic boron nitride is 90%.

The cubic boron nitride is separated from the mixture by the following three steps:
(1) washing with HCl,
(2) heating the residue to 700° C. and
(3) a second washing with HCl of the product resulting from the heating.

The magnesium fluoronitrides are thereby removed.

With a scanning electronic microscope particles in the form of tetrahedrons having dimension of the order .of 1 to 2 μm are observed.

As a comparison, there has been treated as before, but without a previous formation of fluoronitrides, a mixture of $MgF_2$, $Mg_3N_2$ and hexagonal boron nitride in the following proportions:

Molar ratio of $MgF_2/Mg_3N_2=1$
Weigth ratio $(Mg_3N_2+MgF_2)$/hexagonal boron nitride$=1$ The resulting product contains 30% of cubic boron nitride, 70% of hexagonal boron nitride, magnesium fluoronitride $Mg_3NF_3$ and a fluoronitride of unknown composition with a N/F ratio greater than 1, the remainder being the magnesium nitride not having reacted.

By operation in a similar manner but with a molar ratio $Mg_3N_2/MgF_2$ equal to ⅔ identical results are obtained but without any residual magnesium nitride.

This shows that the preparation of cubic boron nitride is not due to the effect of the magnesium nitride but to that of the fluoronitrides formed under pressure.

EXAMPLE 2

Conversion of hexagonal boron nitride into cubic boron nitride in the presence of calcium fluoronitride There is initially reacted in a fritted alumina tube under a stream of pure nitrogen and at atmosphereic pressure, a mixture of calcium nitride, $Ca_3N_2$, and calcium fluoride in a molar ratio equal to 1. The reaction mixture is heated at 1000° C. and maintained at this temperature for 20 hours. There is obtained calcium fluoronitride, $Ca_2NF$, which is a lemon yellow colored compound sensitive to humidity. This compound is appropriately handled and preserved in the absence of air. This product is mixed with hexagonal boron nitride in a 1:1 weight ratio.

The mixture is treated as set forth in Example 1.

After the reaction, a mixture of cubic boron nitride, hexagonal boron nitride, calcium fluoronitride as well as an unknown compound is obtained. The amount of conversion into the cubic boron nitride is 75%. It has been verified that the calcium fluoronitride does not decompose during the reaction stage at high pressure.

As a comparison there has been mixed calcium nitride, calcium fluoride and hexagonal boron nitride, the mixture having the following chracteristics.

Molar ratio $Ca_3N_2/CaF_2$ equal to 1;
Weight ratio $(Ca_3N_2-CaF_2)$/hexagonal boron nitride, 1.

This mixture is submitted to the same conditions as those described above.

After returning to standard conditions, it is noted that the boron nitride remains entirely in hexagonal form. There has not been observed after the reaction the presence of calcium fluoronitride whose color is characteristic, but rather a mixture of $Ca(OH)_2$ and $CaF_2$, as well as the presence of the unknown compound already mentioned above. It is possible that the calcium fluoronitride is then not formed under the conditions of this experiment.

The comparison of these tests shows that the preformed fluoronitride provides the conversion of the hexagonal boron nitride into cubic boron nitride, whereas neither the calcium nitride nor the calcium fluoride provides this conversion under the conditions employed.

EXAMPLE 3

Synthesis of cubic boron nitride starting with ammonium fluoroborate

In this example, there is employed as the source of boron, ammonium fluoroborate $NH_4BF_4$ which can also serve as the source of nitrogen. There is also used, as the source of nitrogen, magnesium nitride $Mg_3N_2$ which, on combination with the fluorides arising from the decomposition of the ammonium fluoroborate, provides the formation in situ of magnesium fluoronitride.

A mixture of ammonium fluoroborate and magnesium nitride in a molar ratio equal to 1 is intimately pulverized.

This mixture is placed in a platinum cell which is inserted in a pyrophyllite cell, the latter then being placed in the apparatus having an annular chamber for high pressures.

The pressure is increased up to 70 kbar, then the temperature is raised to 1200° C. and maintained at this temperature for 10 minutes. After temperature tempering, then slowly lowering the pressure, a mixture of hexagonal boron nitride, cubic boron nitride, $MgF_2$ and magnesium fluoronitride $Mg_2NF$ is obtained. The amount of cubic boron nitride relative to the total boron nitride is 60%.

As a comparison a mixture of $BH_3NH_3$ and $Mg_3N_2$ in a molar ratio $Mg_3N_2/BH_3NH_3$ equal to ⅓ was prepared. The mixture is treated as before. A mixture containing hexagonal boron nitride and other unidentified products is obtained, but the presence of cubic boron nitride is not observed. This shows that the magnesium nitride alone provides neither the direct production of cubic boron nitride nor the conversion of hexagonal boron nitride into cubic boron nitride.

EXAMPLE 4

Synthesis of cubic boron nitride starting with sodium fluoroborate and magnesium nitride In this example, the source of boron is $NaBF_4$ and the source of nitrogen is $Mg_3N_2$.

In addition, magnesium nitride acts as the source of fluoronitride in combination with the fluoride formed by the decomposition of sodium fluoroborate.

As before, a mixture of $NaBF_4$ and $Mg_3N_2$ in a 1:1 molar proportion is prepared.

This mixture is submitted to the same experimental conditions as in the preceding examples.

A mixture of hexagonal boron nitride, cubic boron nitride, $MgF_2$, magnesium fluoronitride MgNF and a mixed fluoride $NaMgF_3$ is obtained. The amount of cubic boron nitride relative to the total boron nitride is 35%.

EXAMPLE 5

Conversion of hexagonal boron nitride into cubic boron nitride

A mixture of graphite type hexagonal boron nitride, LiF and $Mg_3N_2$ is intimately pulverized in the following proportions:

Molar ratio, $LiF/Mg_3N_2 = 3$,

Weight ratio $(LiF + Mg_3N_2)$/hexagonal boron nitride = 1.

This mixture is placed in a platinum capsule. It is inserted into a pyrophyllite cell, the cell being then placed in the annular "belt" type chamber.

The mixture is submitted to the same experimental conditions as in the preceding examples, i.e.: 70 kbar and 1200° C. for 10 minutes. After temperature tempering and analysis of the resulting product there is observed the formation of 90% cubic boron nitride, 10% of the starting boron nitride remaining in the form of hexagonal boron nitride. In addition, the presence of a fluoronitride is noted.

Compared to Example 3, this experiment evidences that the system (Li, Mg, N, F) is, under the same operating conditions, more favorable to the formation of cubic boron nitride than the ternary system (Mg, N, F). In addition, it is not necessary to pre-form a fluoronitride under standard pressure conditions so as to obtain high yields of cubic boron nitride.

The resulting crystals are tetrahedrons having a size ranging from 5 to 10 μm.

EXAMPLE 6

Use of the magnesium nitride + manganese fluoride system

There are intimately pulverized, in a 50:50 weight proportion, hexagonal boron nitride and an equimolar mixture $(Mg_3N_2 + MnF_2)$. The procedures of Example 1 are repeated and cubic boron nitride in a yield of 90% is obtained.

By operating under the same conditions with magnesium nitride alone, without manganese fluoride, the yield is only 30%.

EXAMPLE 7

Use of the calcium nitride + lithium fluoride system

In this example, the mixture of hexagonal boron nitride and catalyst is introduced directly in the graphite microoven of the high pressure equipment, between two wads of lanthanum oxide $La_2O_3$.

The molar ratio $LiF/Ca_3N_2$ is 1.5.

Various hexagonal boron nitride/catalyst proportions have been studied by operating under the following conditions: 1270° C., 60 kbar, time-10 minutes.

To purify the cubic boron nitride, the residual mixture is washed with nitric acid, the mixture being composed of (by X ray diffraction) CaO, $CaF_2$, nonconverted hexagonal boron nitride, cubic boron nitride, $La_2O_3$ (from the wads) and an unknown phase. This washing removes CaO, the unknown phase, $La_2O_3$ and $CaF_2$. The remainder is then heated to 950° C. so as to oxidize, preferentially, the hexagonal boron nitride into $B_2O_3$ which is then dissolved by washing with water.

The unknown phase has been identified. It is a mixed boronitride of calcium and lithium.

The results obtained are set forth in the following table, where r is the weight ratio of hexagonal boron nitride/catalyst, in percent, and d is the average size of the resulting crystals

| r | yield | d |
|---|---|---|
| 35% | 90% | 30–50 μm |
| 50% | 70% | 40–60 μm |
| 60% | 40% | 60–70 μm |

The crystals do not have well defined forms, but the surfaces are smooth and the edges sharp.

In another series of tests the amount of LiF relative to $Ca_3N_2$ has been varied by using $Ca_3N_2 + xLiF$ mixtures, with x being variable, and by keeping the amount of hexagonal boron nitride constant relative to LiF.

The operating conditions were the following: 1300° C., 60 kbar, 10 minutes.

The results are set forth in the following table where r and d are defined above:

| x | r | yield | d |
|---|---|---|---|
| 1.5 | 48% | 70% | 40–60 μm |
| 0.75 | 38% | 70% | 40–90 μm |

In another series of experiments, the cell is filled with alternate layers of hexagonal boron nitride and catalyst, beginning and ending with a boron nitride layer. The catalyst is a mixture of $Ca_3N_2 + 1.5$ LiF.

Three types of cells were made:

A: 4 layers of hexagonal boron nitride + 3 layers of catalyst; thickness of layers: 1.4 mm;

B: 5 layers of hexagonal boron nitride + 4 layers of catalyst; thickness of layers: 1.1 mm; and C: 10 layers of hexagonal boron nitride + 9 layers of catalyst; thickness of layers: 0.5 mm.

The operating conditions were the following: 1300° C., 60 kbar; 10 minutes.

In the A, B and C cells the reactants are introduced in the form of layers of compressed powders. In addition, in a B type cell the layers are introduced in the form of pellets previously formed under pressure.

The results obtained are set forth in the following table:

| Cell | Yield | d |
| --- | --- | --- |
| A | 30% | 50–120 μm |
| B | 30% | 80–160 μm |
| B (pellets) | 30% | 60–150 μm |
| C | 70% | 40–80 μm |

In a general fashion, the crystals have smooth surfaces and sharp edges. They are slightly transparent on observation with an optical microscope, and have an orange color.

EXAMPLE 8

Use of the Ca, Li, N, F system

There is prepared previously, at atmospheric pressure, under a stream of nitrogen, boronitride $Ca_3B_2N_4$ by the reaction of calcium nitride with hexagonal boron nitride.

There is then prepared a mixture of $Ca_3B_2N_4 + xLiF$ with hexagonal boron nitride, x being equal to 1, and the mass ratio boron nitride/$(Ca_3B_2N_4 + LiF)$ being equal to 0.5.

The mixture is introduced into the cell for high pressures.

The operating conditions are: 1300° C., 60 kbar, time - 10 minutes.

There are obtained, with a yield of 40%, orange colored crystallites of cubic boron nitride having a size of 30–80 μm.

EXAMPLE 9

Preparation of a mixed boronitride of calcium and lithium

Calcium boronitride and lithium nitride are mixed in a molar proportion $Li_3N/Ca_3B_2N_4$ equal to 0.05.

The mixture is heated at 950° C. for 2 hours under a nitrogen atmosphere.

By X ray diffraction the resulting product is identified as one containing, on the one hand, calcium nitride and, on the other hand, a cubic phase comprising a mixed boronitride of calcium and lithium having the formula:

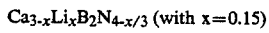

$Ca_{3-x}Li_xB_2N_{4-x/3}$ (with x=0.15)

having a size of about 5.09 Angstroms.

By doubling the amount of $Li_3N$, a mixed boronitride of the same formula, with x=0.3 is obtained. Size: 5.03 Angstroms.

EXAMPLE 10

Use of the $Mg_3N_2 + ZrF_4$ system

The catalyst system is a mixture of $Mg_3N_2 + xZrF_4$, with x being ⅜. It is admixed with hexagonal boron nitride wherein the mass proportion, catalyst/hexagonal boron nitride, is 1.

The mixture is introduced in the cell for high pressure. The operating conditions are the following: 1300° C., 60 kbar, 10 minutes.

By replacing the magnesium nitride with calcium nitride, there is obtained, in a comparable yield, cubic boron nitride in the form of crystals having a size ranging from 1 to 10 μm.

What is claimed is:

1. A process for preparing cubic boron nitride comprising (i) heating at an elevated temperature and under a high pressure a starting material comprising (1) a source of boron, (2) a source of nitrogen and (3) a fluoronitride, for a time sufficient for forming cubic boron nitride; (ii) quenching the reaction mixture; and (iii) reducing the pressure to atmospheric pressure, wherein
    (a) said elevated temperature is a temperature sufficient for the appearance of a liquid phase,
    (b) said high pressure is one at which cubic boron nitride is formed, and
    (c) said sources of boron and nitrogen are in condensed form under standard conditions of temperature and pressure.

2. The process of claim 1 wherein said fluoronitride is an alkali fluoronitride, an alkaline earth metal fluoronitride or mixed fluoronitrides of these metals.

3. The process of claim 1 wherein said fluoronitride is admixed with a fluoride.

4. The process of claim 1 wherein said fluoronitride is (i) magnesium fluoronitride, (ii) calcium fluoronitride, (iii) barium fluoronitride or (iv) mixed fluoronitrides of (i), (ii) or (iii) with an alkali metal, manganese or zirconium.

5. The process of claim 1 wherein said source of boron is ammonium fluoroborate, an alkali metal fluoroborate or an alkali borohydride.

6. The process of claim 1 wherein said source of nitrogen is a nitride, amide or non-oxygenated ammonium salt.

7. The process of claim 1 whrein said source of boron and nitrogen comprises hexagonal boron nitride.

8. The process of claim 1 wherein said fluoronitride is present in an amount ranging from 10 to 70 percent by weight relative to the total weight of the starting material.

9. The process of claim 1 wherein the starting material comprises alternate layers of (1) and (2) and of (3).

10. The process of claim 1 wherein said pressure is between 4 and 9 GPa.

11. The process of claim 1 wherein said temperature is at least 1,000° C.

12. The process of claim 1 wherein said fluoronitride is formed in situ.

13. A compound of the formula

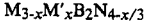

$M_{3-x}M'_xB_2N_{4-x/3}$ wherein
M is an alkaline earth metal,
M' is an alkali metal and
x is a number, other than 0 but lower than or equal to 1.

14. The compound of claim 13 wherein M represents Ca, M' represents Li and x is lower than or equal to 0.3.

* * * * *